C. DEGOUMOIS.
DEVICE FOR BRAKING TRAM CARS AND ELECTRIC RAILWAY CARRIAGES.
APPLICATION FILED JUNE 20, 1908.
972,514.
Patented Oct. 11, 1910.
3 SHEETS—SHEET 1.
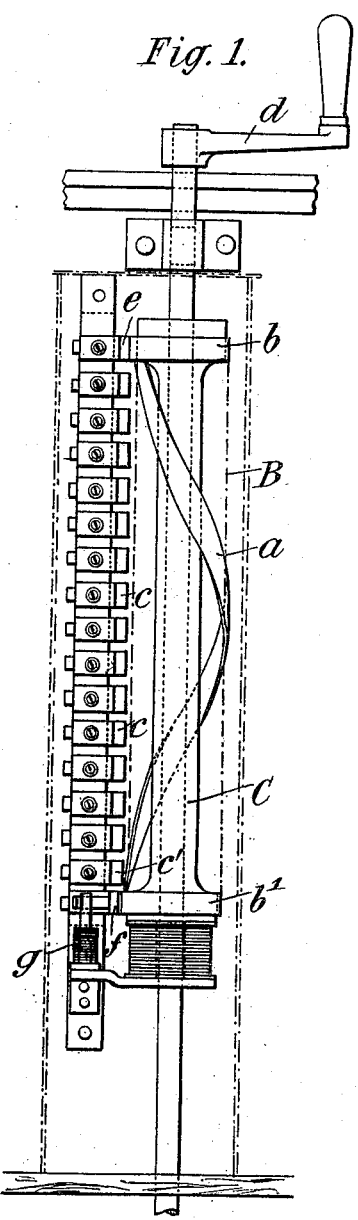
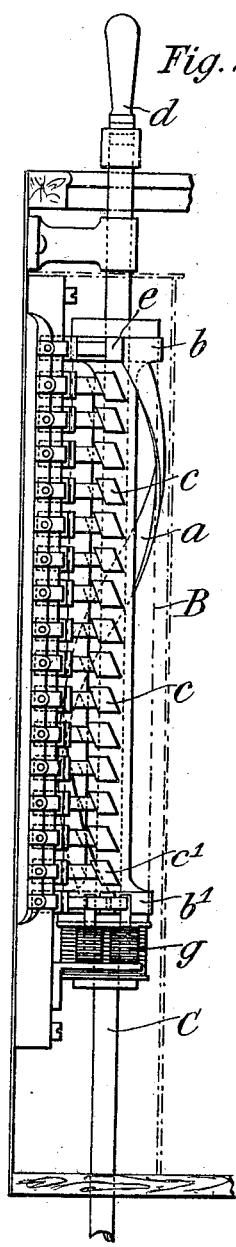
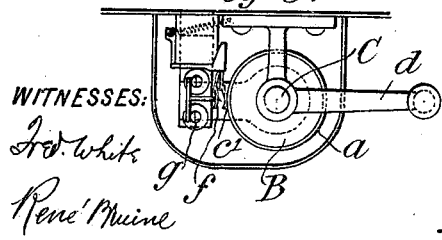

C. DEGOUMOIS.
DEVICE FOR BRAKING TRAM CARS AND ELECTRIC RAILWAY CARRIAGES.
APPLICATION FILED JUNE 20, 1908.
972,514.
Patented Oct. 11, 1910.
3 SHEETS—SHEET 2.
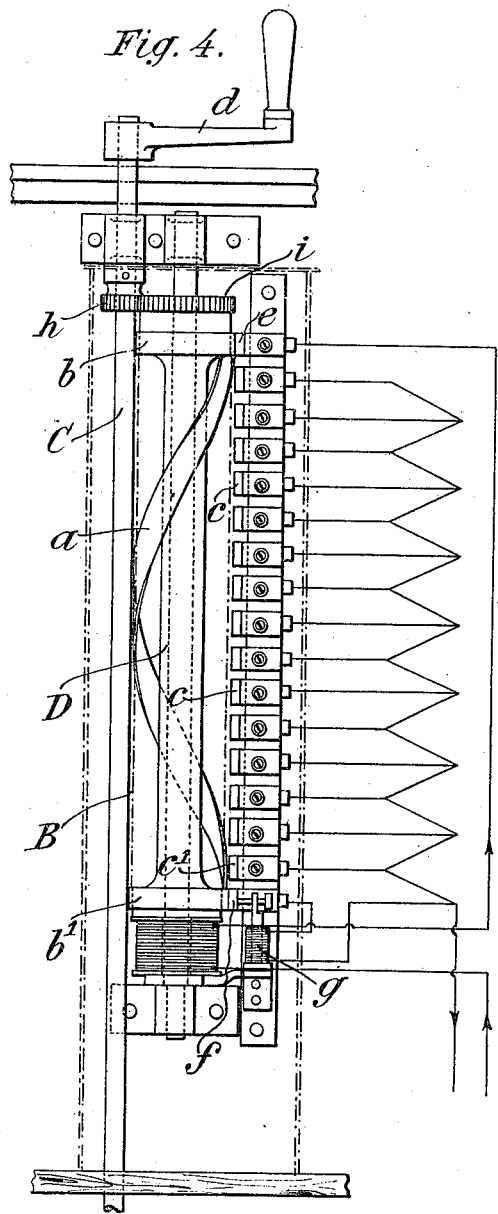
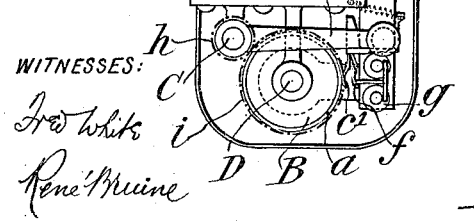
WITNESSES:
INVENTOR
Charles Degoumois,
By Attorneys,

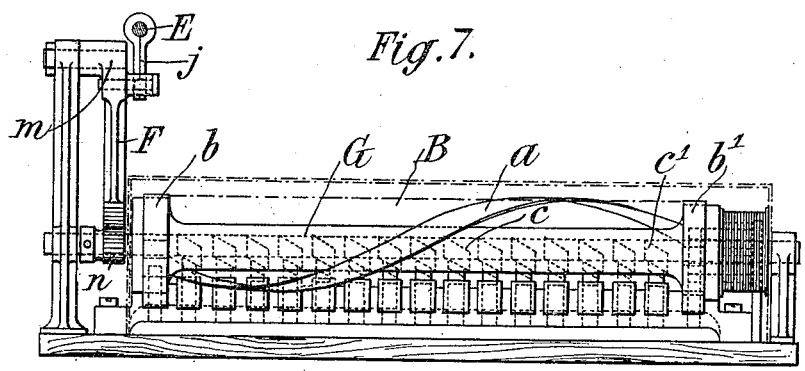
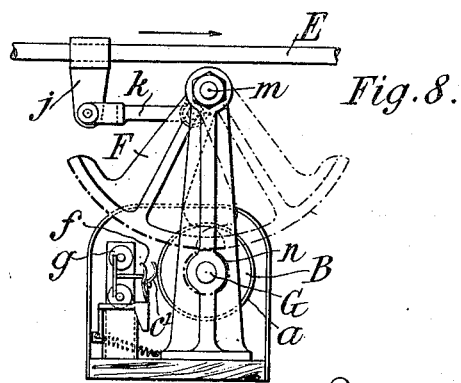
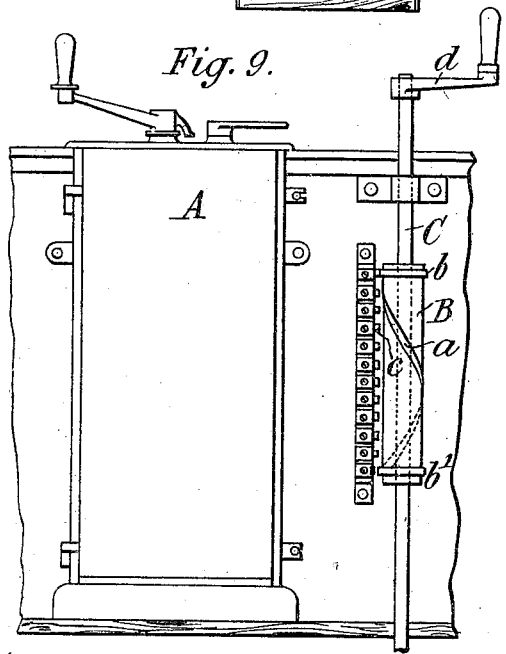
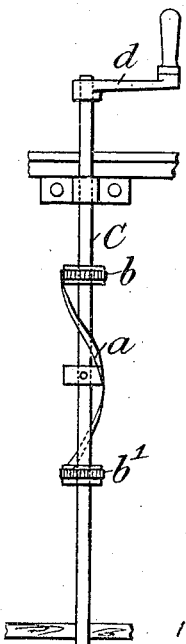

UNITED STATES PATENT OFFICE.

CHARLES DEGOUMOIS, OF BERNE, SWITZERLAND, ASSIGNOR TO CHARLES DEGOUMOIS, OF BERNE, SWITZERLAND, ET STÉ SEGHERS ET PARADIS, OF PARIS, FRANCE.

DEVICE FOR BRAKING TRAM-CARS AND ELECTRIC-RAILWAY CARRIAGES.

972,514.     Specification of Letters Patent.     Patented Oct. 11, 1910.

Application filed June 20, 1908. Serial No. 439,641.

*To all whom it may concern:*

Be it known that I, CHARLES DEGOUMOIS, a citizen of the Swiss Republic, residing in Berne, Switzerland, have invented certain new and useful Improvements in Devices for Braking Tram-Cars and Electric-Railway Carriages, of which the following is a specification.

This invention has for its object to provide a braking device for electric carriages, which is not a brake proper, but which is a means for causing the braking of a vehicle provided with an electric motor, by throwing such motor into short-circuit in such a way that the braking of the vehicle is caused by the short-circuit current.

The short-circuiting of the electric motor of a vehicle has already been used for retarding the vehicle, but the means which have been heretofore proposed have not given satisfactory results because in using the short circuit the same number of resistances were used as when the motor was started for driving the vehicle. If a comparatively limited number of resistances is sufficient for starting, such limited number of resistances is not suitable for causing the braking which in such circumstances is jerky and violent. The system according to the present invention has been designed to avoid this disadvantage and to produce a continuous and regular braking, when the driver of an electric carriage short circuits the motor. Such result is obtained by a suitable division of the resistances which are arranged on the carriage and which are connected with a sufficiently large number of keys by which the resistances may be thrown out of the short-circuit successively and gradually so as to cause progressively and gently the full stoppage of the vehicle. This is obtained by using the conductor cylinder only for the starting of the vehicle, the braking through short-circuit of the motor being obtained by means of another cylinder independently from the first, and arranged as hereinafter described with reference to the annexed drawing which shows, only by way of example, several forms of the apparatus and in which, Figures 1, 2 and 3 show front and side elevations and a plan view respectively, of the whole apparatus. Figs. 4, 5 and 6 are similar views of a modified form. Figs. 7 and 8 are a front and an end view respectively of another modified form showing the system as applied to a driving gear underneath the carriage. Fig. 9 is an elevation showing the device as applied to the hand brake controlling shaft on a smaller scale. Fig. 10 is a detail of a modified form.

In Fig. 9, A is the ordinary cylinder, which in connection with this invention is only used as starting cylinder. Parallel to this cylinder A is arranged another independent cylinder B made of wood or any other insulating material, on which is arranged a metal contact piece $a$ of helical form of the whole length of the cylinder and extending over about 4/5 of the circumference. This helical band $a$ has its upper and lower ends connected with circular rings $b$ $b^1$ respectively. Alongside of the cylinder B are arranged metal keys $c$ which are connected to the usual resistances of the vehicle actually used for starting, and which resistances are also used with the present invention when the braking is effected by throwing the motor or motors into short-circuit. The cylinder B is mounted on the shaft C provided with a crank located within the reach of the motorman. The cylinder B is not absolutely indispensable. The band $a$ and the contacts $b$ $b^1$ may be fixed to insulating rings (of insulating material such as stutilite, micanite, wood, &c.) secured on the brake shaft C and retained through cross pins. Such arrangement is very simple, cheap and strong. Any other arrangement may be used provided that $a$ $b$ $b^1$ be mounted on material insulating them from C. In the arrangement, Figs. 1 to 3 and 9, this shaft C is the shaft of the mechanical brake, so that the motorman has only to turn the crank $d$ for braking as soon as the crank of the starting cylinder A has been returned to zero. When turning the cylinder B, the motor is first short-circuited, all the resistances being in short-circuit, and these resistances are then successively thrown out of circuit as the motorman turns the crank $d$ until the carriage has completely stopped. Then at that time only, the motorman continuing to turn the crank $d$, the mechanical brake is operated and the carriage is mechanically braked so as to hold the carriage when, for instance, being stopped on an incline, it tends to run down naturally.

The upper ring $b$ is always in contact with a finger $e$ in which the short-circuit current ends when the latter is produced by the motor, then operating as a generator driven by the acquired momentum of the vehicle. As above explained, the keys $c$ are brought successively in contact with the helical band $a$, as the motorman turns the crank $d$, so that the circuit is closed through a gradually diminishing number of resistances. The maximum effect of the short-circuit current is attained when the next to the last key, designated as $c^1$, Fig. 1, is in contact with the helical band $a$. At that time, the maximum braking current passes through $e$, $b$, the band $a$ and the key $c^1$ and finally through an electro-magnet $g$, which has the effect of attracting an armature causing an additional finger $f$ which is opposite the lower circular ring $b^1$, but which is normally kept away from such ring by a spring, to move. As soon as this latter terminal $f$ arrives in contact with the ring $b^1$, as just explained, the motorman by turning further the crank $d$, keeps up the maximum braking of the carriage until the same has stopped, thereafter blocking the same by means of the mechanical brake. The arrangement of this finger $f$ and its operation through the electro-magnet have been rendered necessary by the following reasons; the cylinder B being attached to the shaft C of the mechanical brake, the motorman has to turn several times to release the power brake, when starting up an incline, having already inserted the first starting key, to prevent the carriage running back. On the other hand the finger $f$ must operate only after a complete operation of the braking shaft because the cylinder B of the rear platform of the carriage may be accidentally moved from its dead point by a passenger, a finger $c$ being brought in contact with the band $a$. Consequently should the finger $f$ be at that time against a ring $b^1$ all of the resistances, or at least a greater part of them, would be short-circuited, the line current being capable of passing through the finger $c$ into contact with the band $a$ and the finger $f$. This would result in a jerking jump of the carriage, and perhaps in the impossibility of starting. Such drawback would also occur for the same reasons during the braking and would make the controlling of the speed impossible. On the other hand, as this band $a$ is only displayed on about the 4/5 of the surface of the cylinder B, and the latter has to make several revolutions to attain the complete tightening of the mechanical brake, it will be evident, should the finger $f$ not exist, that a breaking of the circuit would occur at each revolution, and a violent arc would be produced each time the band $a$, after having been in contact with the key $c'$ through the continuation of rotation of B, would be disengaged from this key. To obviate this inconvenience, the finger $f$ which is only a duplicate of the finger $c^1$ is kept, by a spring, away from the ring $b^1$ with which it only comes into contact when the electro-magnet $g$, the armature of which is controlled by this finger, is traversed by the maximum braking current from the twin-finger $c^1$ electrically connected with the finger $f$. It will then be easily understood, that the finger $f$ will only be disengaged from the ring $b^1$, when the braking current is out, that is to say when the carriage is stopped. This arrangement, as soon as the finger $f$ is laid on the ring $b^1$, will thus allow of the crank of the power brake to be turned at will to apply the mechanical brake, while maintaining the maximum stress of the braking current, and that without interruption. Since the electro-magnet $g$ is connected within the brake circuit, it never receives current from the line, and the finger $f$ never operates while running. When the carriage is started after a stop, the mechanical brake is loosened in the ordinary way. Should the motorman already have inserted the first forward running key (for example going up an incline), after a stop, only small braking sparks will be produced between each of the keys and the band $a$ because of the drop of potential between these fingers.

In the modification illustrated Figs. 4 to 6, the cylinder B which carries the helical metal band $a$, is mounted on a vertical shaft D, which is no more the shaft of the power brake C, but which is connected thereto by means of a pinion $h$ and a toothed wheel $i$. The operation of this apparatus is the same as described with reference to the Figs. 1 to 3, except that the motorman obtains the maximum braking stress through short-circuiting the motor, not by a single crank revolution but only after several revolutions, owing to the relation of the gears $h$ $i$. Moreover, the transmission of motion from the crank shaft C of the mechanical brake to the braking cylinder B, permitting the effecting of the short-circuit braking, may be obtained by other means than those previously described, (for example, by means of levers, racks, pulleys, screws, nuts, cables, flexible shafts, etc.) These transmission devices can moreover be used for operating the braking cylinder whether the same is located under the floor or on the truck of the carriage, and at any point on the latter. Such an arrangement is shown in Figs. 7 and 8. E is a rod or bar which is arranged under the carriage, and which receives the motion of any transmission, and the motion required for operating the braking cylinder will be taken from this bar. On this rod E is fixed a support $j$ to which is hinged a connecting rod $k$ connected to a segment F pivoted at $m$. Such toothed segment engages with a pinion $n$ on the shaft G of the braking cylinder. The latter is provided, like the previous one, with the helical metal band $a$ ending with the end rings $b$ $b^1$, and with which one of the keys $c$ have to make contact. Near the ring $b^1$, we again find the key $c^1$, the finger $f$ and the electro-magnet $g$ which receives the electric current, when the key $c^1$ comes in contact with the band $a$, whereby the finger $f$ is disengaged to play the part previously described. It will be understood that the pull exerted on the bar E in a suitable direction, for example in the direction of the arrow, Fig. 8, has the effect of causing the toothed segment F to oscillate and to cause the pinion $n$ and thereby the braking cylinder to revolve, in the manner previously described. It will be observed that the supplementary shaft $m$ of the segment F is substantially the equivalent of the supplementary shaft C of Fig. 4, except as to the ratio of the gearing connecting the two shafts; also that these supplementary shafts and the reciprocating operating rod E (Fig. 8) are merely optional additional elements of the apparatus, and are not mutually exclusive. The supplementary shafts may be used or not as desired in connection with the main shaft, and where used the supplementary shaft may be operated directly by hand or by the operating rod E.

I claim as my invention:—

1. A braking device for electric cars acting through a short-circuiting of the motor or motors, and including in combination a shaft independent of that for starting the motor, a series of resistances in a short-circuit, a series of keys connected with said resistances, and a metal band carried by said shaft and arranged to withdraw the resistances progressively from the short-circuit as the shaft is turned.

2. A braking device for electric cars acting through a short-circuiting of the motor or motors, and including in combination a shaft independent of that for starting the motor, a series of resistances in a short-circuit, a series of keys connected with said resistances, an upper and a lower ring connected with said shaft, and a helical metal strip connecting said rings, the upper ring being constantly in contact with the first of said keys, and the helical strip being arranged to contact successively with the other keys as the shaft is turned and to thereby progressively withdraw the resistances from the short-circuit.

3. A braking device for electric cars acting through a short-circuiting of the motor or motors, and including in combination a shaft independent of that for starting the motor, a series of resistances in a short-circuit, and means for withdrawing said resistances progressively from the short-circuit as said shaft is turned, and means operated by the withdrawing of the last resistance of the series from the short-circuit for maintaining said resistances withdrawn during the continued movement of the shaft.

4. A braking device for electric cars acting through a short-circuiting of the motor or motors, and including in combination a shaft independent of that for starting the motor, a series of resistances in a short-circuit, a series of keys connected with said resistances, an upper and a lower ring connected with said shaft, and a helical metal strip connecting said rings, the upper ring being constantly in contact with the first of said keys, and the helical strip being arranged to contact successively with the other keys as the shaft is turned and to thereby progressively withdraw the resistances from the short-circuit, a supplemental key in position to engage the lower ring but normally yieldingly withheld therefrom, an electromagnet for pressing said supplemental key against the lower ring and which is energized by the engagement of the last regular key of the series with the helical strip, said supplemental key being electrically connected with the last regular key of the series, whereby its contact with the lower ring insures the maintaining of all the resistances withdrawn during the continued rotation of the shaft.

5. A braking device for electric cars acting through a short-circuiting of the motor or motors, and including in combination a shaft independent of that for starting the motor, a series of resistances in a short-circuit, and means for withdrawing said resistances progressively from the short-circuit as said shaft is turned, and means operated by the withdrawing of the last resistance of the series from the short-circuit for maintaining said resistances withdrawn during the continued movement of the shaft, and a mechanical brake operated by the rotation of said shaft beyond the point at which all the resistances are withdrawn from the short-circuit.

6. A braking device for electric cars acting through a short-circuiting of the motor or motors, and including in combination a shaft independent of that for starting the motor, a series of resistances in a short-circuit, and means for withdrawing said resistances progressively from the short-circuit as said shaft is turned, and an adjacent supplementary shaft through which the movement is transmitted to the first mentioned shaft, and a reciprocating rod for actuating said supplementary shaft.

In witness whereof, I have hereunto signed my name in the presence of two subscribing witnesses.

CHARLES DEGOUMOIS.

Witnesses:
LEO F. FRANKENTHAL,
AMAND BRAUN.